United States Patent
Hattori et al.

[11] Patent Number: 5,945,173
[45] Date of Patent: Aug. 31, 1999

[54] METHOD OF MAKING OPTICAL FIBER RIBBON

[75] Inventors: Tomoyuki Hattori; Toshihisa Sato; Kohei Kobayashi; Kaoru Okuno; Ken Takahashi; Ryoei Oka, all of Yokohama, Japan

[73] Assignee: Sumitomo Electric Industries, Ltd., Osaka, Japan

[21] Appl. No.: 08/985,657

[22] Filed: Dec. 5, 1997

[30] Foreign Application Priority Data

Dec. 6, 1996 [JP] Japan ................................. 8-327053

[51] Int. Cl.$^6$ ........................................................ C08F 2/48
[52] U.S. Cl. ........................ 427/508; 427/163.2; 427/359; 427/385.5; 427/558; 427/559; 427/595
[58] Field of Search ................................. 427/163.2, 359, 427/385.5, 508, 558, 559, 595

[56] References Cited

FOREIGN PATENT DOCUMENTS 1-191110  8/1989  Japan .
1-149904  12/1990  Japan .

*Primary Examiner*—Bernard Pianalto
*Attorney, Agent, or Firm*—Pillsbury Madison & Sutro LLP

[57] ABSTRACT

An optical fiber ribbon is manufactured under a condition where, assuming that the optical fiber ribbon has a thickness of 2d (mm), a guide roller has a diameter of 2R (mm), and a period of time till the optical fiber ribbon comes into contact with the guide roller after leaving an ultraviolet irradiation apparatus is t (ms), a relationship of $d/[(R+d) \times t] < 0.2$ is satisfied. Accordingly, no damages are imparted to the optical fiber ribbon, and no micro-bendings occur in its coated optical fibers, whereby the transmission characteristic can be prevented from deteriorating.

5 Claims, 2 Drawing Sheets

METHOD OF MAKING OPTICAL FIBER RIBBON

BACKGROUND OF THE INVENTION

1. Field of the Invention

The present invention relates to a method of making an optical fiber ribbon in which a plurality of coated optical fibers are arranged in a plane and bundled together into a tape form.

2. Related Background Art

In an optical fiber ribbon, a plurality of coated optical fibers arranged in parallel are bundled together as being coated with a collective coating material made of an ultraviolet curable resin. In the conventional method of making an optical fiber ribbon, after a plurality of coated optical fibers are collectively coated with an ultraviolet curable resin, thus coated ultraviolet curable resin is irradiated with an ultraviolet ray in an ultraviolet irradiation apparatus so as to be cured. Here, as an ultraviolet lamp for generating the ultraviolet ray emits light, a considerable amount of heat is generated. Due to this heat, the collective coating material is softened and, in this state, comes into contact with other hard materials, whereby the surface of the optical fiber ribbon may be damaged, or the coated optical fibers may be negatively effected by micro-bendings.

In order to overcome such a problem, for example, in Japanese Patent Application Laid-Open No. 1-191110, an optical fiber ribbon is produced while a cooling gas is caused to flow into an ultraviolet irradiation (curing) apparatus so as to make the surface temperature of the optical fiber ribbon lower than the glass transition temperature of the ultraviolet curable resin. Also, in this publication, a plurality of stages of ultraviolet irradiation apparatus each having an output not greater than a predetermined level are provided, and an optical fiber ribbon is produced while the surface temperature of the optical fiber ribbon in the ultraviolet-curing process is made lower than the glass transition temperature of the ultraviolet curable resin.

In Japanese Utility Model Application Laid-Open No. 2-149904, on the other hand, cooling water is caused to flow through a hollow portion in the vicinity of the outer periphery of a capstan for pulling an optical fiber ribbon coated with an ultraviolet curable resin, thereby cooling the cured optical fiber ribbon.

SUMMARY OF THE INVENTION

After diligent studies, the inventors have found the following problems. Namely, the inventors have found that not only it is impossible to suppress damages in the optical fiber ribbon surface and micro-bendings in the coated optical fibers by simply cooling the optical fiber ribbon under the condition of the conventional methods of making an optical fiber ribbon, but also the damages in the optical fiber ribbon surface are attributable to factors other than temperature as well. That is, it has been found that the curing reaction for the collective coating material has not been finished yet at the time when the optical fiber ribbon comes out of the ultraviolet irradiation apparatus but would further advance thereafter. In this mechanism, when the optical fiber ribbon is irradiated with an ultraviolet ray, a photopolymerization initiator contained in the collective coating material absorbs the ultraviolet ray, thereby generating radicals. The radicals initiate the curing reaction for the ultraviolet curable resin. Once the radicals are generated in the resin by ultraviolet radiation, the curing reaction proceeds as long as the radicals exist in the resin even when no ultraviolet ray is irradiated thereafter.

The curing reaction for the ultraviolet curable resin is a radical reaction, whose rate of progress is very high. Nevertheless, as the technology for making the optical fiber ribbon has recently advanced, the transfer rate for the optical fiber ribbon in manufacture has greatly increased, whereby the ultraviolet irradiation time has become shorter than the time required for the curing reaction. Consequently, if the optical fiber ribbon comes into contact with a guide roller in a state where the curing reaction has not sufficiently advanced and the temperature of the optical fiber ribbon is sufficiently low, the transmission characteristic of the optical fiber ribbon will deteriorate due to damages in the surface thereof or micro-bendings in the coated optical fibers.

It is an object of the present invention to provide a method of making an optical fiber ribbon which can prevent damages in the optical fiber ribbon surface and micro-bendings in the coated optical fibers from occurring and transmission loss from increasing.

The present invention provides a method of making an optical fiber ribbon, the method comprising:

a step of preparing an ultraviolet irradiation apparatus and a guide roller having a diameter of 2R (mm);

a step of arranging at least two coated optical fibers in parallel in a plane;

a step of collectively coating thus arranged coated optical fibers with a collective coating material containing an ultraviolet curable resin;

a step of irradiating the collective coating material with an ultraviolet ray in the ultraviolet irradiation apparatus so that the collective coating material cures to form the optical fiber ribbon having a thickness of 2d (mm); and a step of bringing into contact with the guide roller the optical fiber ribbon leaving the ultraviolet irradiation apparatus such that a period of time t (ms) till the optical fiber ribbon comes into contact with the guide roller after leaving the ultraviolet irradiation apparatus satisfies the following relational expression:

$$d/[(R+d) \times t] < 0.2.$$

Here, the coated optical fiber is an optical fiber coated with at least one coating layer.

The optical fiber ribbon is the one where the coated optical fibers arraged in parallel in a plane are bundled together into a tape form as being covered with a collective coating material.

In accordance with the present invention, since the period of time t during which the optical fiber ribbon travels from the ultraviolet irradiation apparatus to the guide roller so as to come into contact with the latter is taken into consideration in regard to the term $d/(R+d)$ that is related to its magnitude of distortion, the optical fiber ribbon is brought into contact with the guide roller in a state where the curing reaction has sufficiently advanced. Consequently, no damages are imparted to the optical fiber ribbon surface, and no micro-bendings occur in the coated optical fibers, whereby the transmission characteristic can be prevented from deteriorating, i.e., transmission loss can be prevented from increasing.

Also, the present invention provides a method of making an optical fiber ribbon, wherein the ultraviolet curable resin constituting the collective coating material preferably has a glass transition temperature within the range of at least 70° C. but not higher than 150° C.

In accordance with the present invention, stress relaxation tends to be retarded when the glass transition temperature exceeds 150° C.; whereas, when it is lower than 70° C., Young's modulus at room temperature tends to decrease, thus deteriorating the lateral pressure property. Therefore, within the glass transition temperature range of at least 70° C. but not higher than 150° C., excellent characteristics can be obtained both in view of lateral pressure property and stress relaxation.

Further, the present invention provides a method of making an optical fiber ribbon, wherein an acylphosphine oxide type polymerization initiator is preferably added by at least 1 part by weight but not more than 5 parts by weight to 100 parts by weight of the ultraviolet curable resin in the collective coating material.

In accordance with the present invention, as the acylphosphine oxide type polymerization initiator is used, the curing reaction for the ultraviolet curable resin can be accelerated, thus allowing the optical fiber ribbon to be made in a shorter period of time.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, preferred embodiments of the method of making an optical fiber ribbon in accordance with the present invention will be explained with reference to FIGS. 1 to 3.

Figure 1:
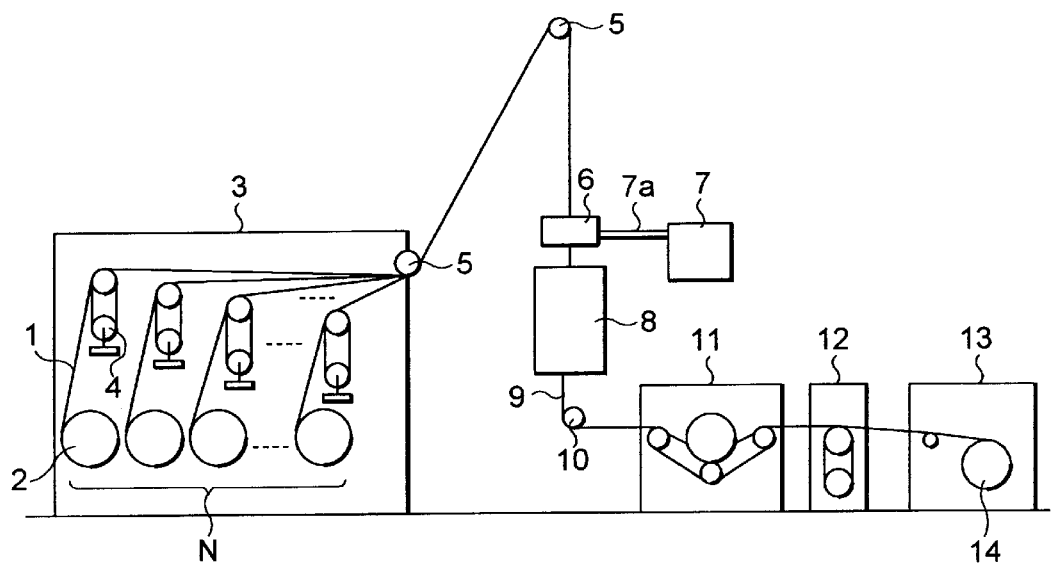
FIG. 1 is a schematic view showing an apparatus for making an optical fiber ribbon to which an embodiment of the method of making an optical fiber ribbon in accordance with the present invention is applied.

FIG. 1 is a schematic view showing an apparatus for making an optical fiber ribbon to which a preferred embodiment of the method of making an optical fiber ribbon in accordance with the present invention is applied. On the other hand, FIGS. 2A and 2B are vertical sectional views respectively showing 4-fiber ribbon and 8-fiber ribbon.

The optical fiber ribbon used in the present invention is the one where a plurality of coated optical fibers 1 arranged in parallel in a plane are bundled together as being covered with a collective coating material containing an ultraviolet curable resin. In this specification, the optical fiber ribbon with N coated optical fibers (N: an integer larger than 2) refers to "N-fiber ribbon".

Figure 2A:
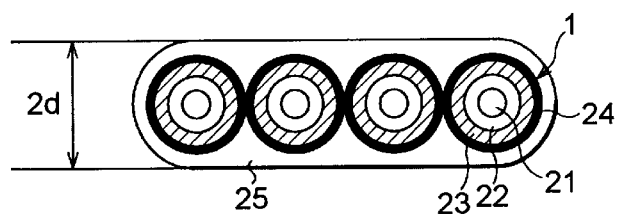
FIG. 2A is a vertical sectional view showing a 4-fiber ribbon.
Figure 2B:
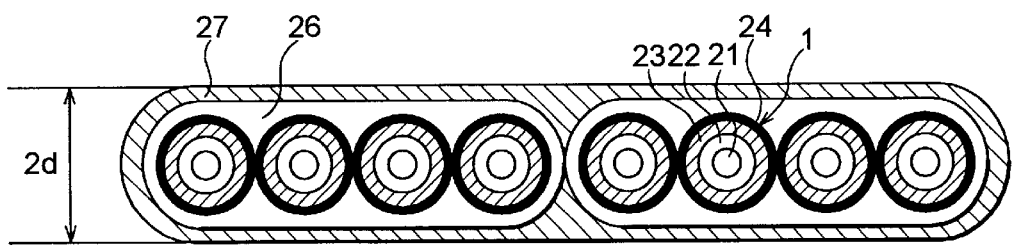
FIG. 2B is a vertical sectional view showing an 8-fiber ribbon.
Figure 3:
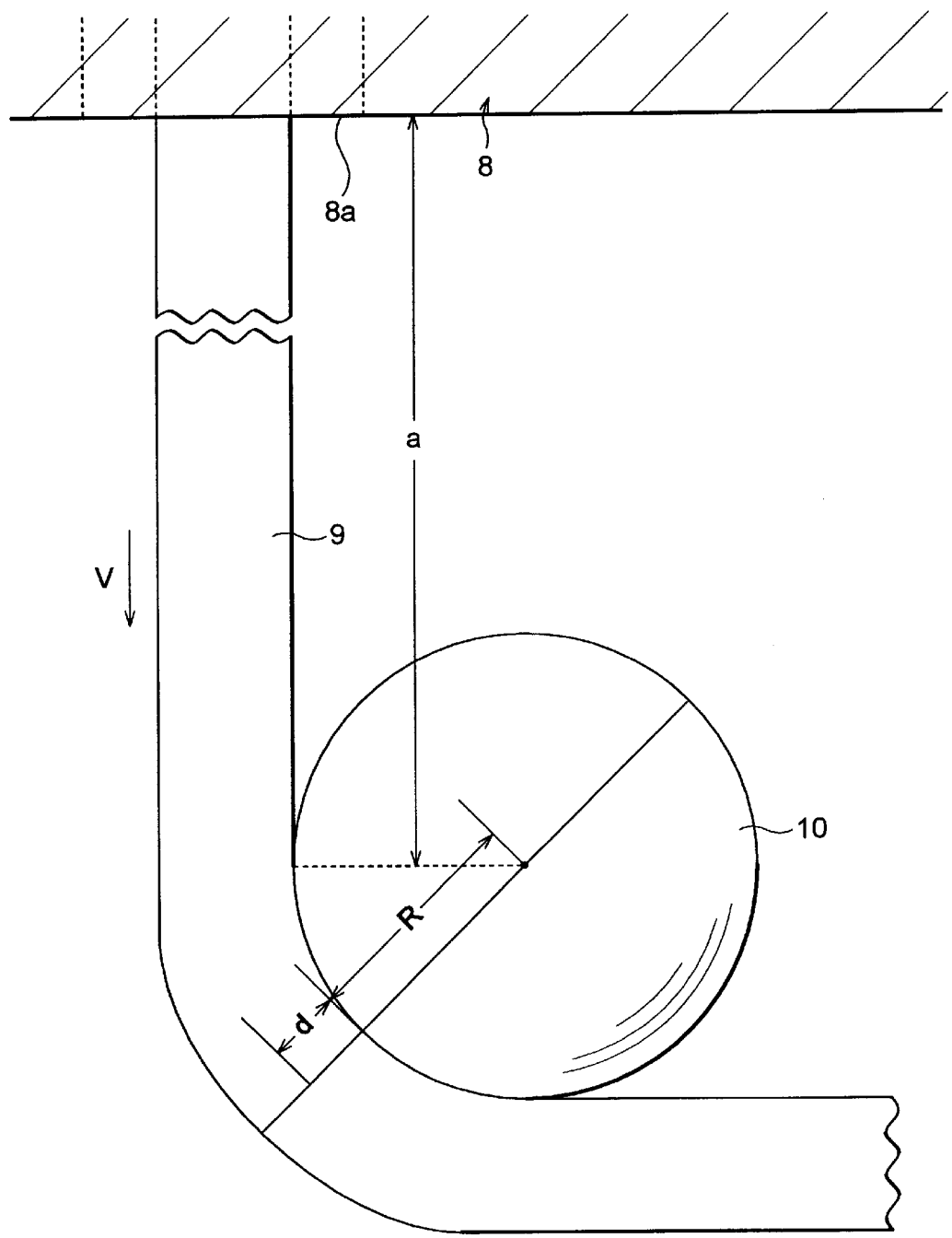
FIG. 3 is a schematic view outlining an optical fiber ribbon and a guide roller.

Referring to FIG. 2A, the 4-fiber ribbon, where four coated optical fibers 1 are arranged in parallel in a plane, is shown. For example, each of coated optical fibers 1 is of a structure wherein a silica glass optical fiber 21 having a diameter of 125 μm is coated by an inner protection coating layer 22, then an outer protection coating layer 23, and then an identifying color layer 24 as the outermost layer. Further, four coated optical fibers 1, in their arranged state, are bundled together by a collective coating material 25 containing an ultraviolet curable resin.

Though the protection coating layer is indicated by two layers consisting of the inner protection coating layer 22 and the outer protection coating layer 23 in FIG. 2A, it may be constituted by one layer or three or more layers as well. Also, the color layer 24 may be omitted.

Referring to FIG. 2B, an 8-fiber ribbon, where eight coated optical fibers 1 are arranged, is shown. In the 8-fiber ribbon, each group of four coated optical fibers 1 arranged in parallel is coated with an inner collective coating material 26 and then both groups, as a whole, are coated with an outer collective coating material 27.

In the following, the method of making an optical fiber ribbon will be explained with reference to FIG. 1. In this drawing, an N-fiber ribbon, which comprises a single layer of collective coating material and N coated optical fibers, is shown.

First, N coated optical fibers 1 are delivered from a supply 3 for delivery equipped with N pieces of reels 2 respectively wound with the coated optical fibers 1. Here, several tens of grams of tension are being applied to the coated optical fiber 1 via a dancer roller 4. Thus delivered N coated optical fibers 1 are collected by two pieces of guide rollers 5 each having grooves corresponding thereto, and then are arranged in parallel while being closely in contact with each other before being sent to a coating apparatus 6. In the coating apparatus 6, a collective coating materials 25 containing an ultraviolet curable resin is supplied from a pressure-type resin tank 7 through a pipe 7a and then N coated optical fibers 1 are collectively coated with the collective coating material 25.

Preferably usable as the ultraviolet curable resin contained in the collective coating material 25 are urethane acrylate type ultraviolet curable resins and epoxy acrylate type ultraviolet curable resins, for example. The ultraviolet curable resin has a glass transition temperature preferably within the range of at least 70° C. but not higher than 150° C. and more preferably within the range of at least 80° C. but not higher than 140° C. Stress relaxation tends to be retarded when the glass transition temperature exceeds 150° C.; whereas, when it is lower than 70° C., Young's modulus at room temperature tends to decrease, thus deteriorating the lateral pressure property. Therefore, within the glass transition temperature range mentioned above, optimal characteristics can be obtained both in view of lateral pressure property and stress relaxation. Here, the rate of stress relaxation is related to distortion occurring in the optical fiber ribbon which will be explained later.

Further, the faster the curing reaction for the collective coating material 25 is, the more excellent the productivity becomes, thus being advantageous in the optical fiber ribbon production. Acylphosphine oxide type polymerization initiators are excellent in accelerating the curing reaction and thus are very effective in the optical fiber ribbon production.

Preferably usable as examples of such acylphosphine oxide type polymerization initiator are 2,4,6-trimethylbenzoyldiphenylphosphine oxide, bis(2,6-dimethoxybenzoyl)-2,4,4-trimethylpentylphosphine oxide, and the like. Examples of polymerization initiators which can be used together with the acylphosphine oxide type polymerization initiator include α-hydroxyacetophenone, benzyl ketal, α-aminoacetophenone, and the like. More specifically, 2-hydroxy-2-methyl-1-phenylpropanone, 2,2-dimethoxy-2-phenylacetophenone, and the like can be used, for example.

When the amount of acylphosphine oxide type polymerization initiator added to 100 parts by weight of the ultraviolet curable resin contained in the collective coating material 25 is less than 1 part by weight, the rate of curing reaction tends to become insufficient; whereas, when it exceeds 5 parts by weight, light energy is absorbed by the polymerization initiator itself, whereby curing tends to become insufficient at a deep portion of the coating. Therefore, in the collective coating material 25, it is preferred that at least 1 part by weight but not more than 5 parts by weight of acylphosphine oxide type polymerization initiator be added to 100 parts by weight of the ultraviolet curable resin.

And then, the coated optical fibers 1 coated with the collective coating material 25 leaving the coating appatus 6 pass through the ultraviolet irradiation apparatus 8, in which the collective coating material 25 is irradiated with an ultraviolet ray so as to be cured. Then, the optical fiber ribbon 9 leaving the ultraviolet irradiation apparatus 8 is brought into contact with a guide roller 10. Thus formed N-fiber ribbon 9, in which N coated optical fibers 1 are bundled together like a tape, passes through a feeding capstan 11 and a winding tension control dancer 12, and then is wound up by a winding apparatus 13 around a predetermined reel 14. At this time, the winding tension is set to several tens grams to several hundreds of grams.

Here, the shorter is the period of time t till the optical fiber ribbon 9 comes into contact with the guide roller 10 after leaving the outlet 8a of the ultraviolet irradiation apparatus 8, the lower becomes the degree of progress in the curing reaction for the ultraviolet curable resin contained in the collective coating material 25. Therefore, the collective coating material 25 becomes so soft that even a slight distortion may cause the transmission characteristic to deteriorate. When the period of time t is longer, by contrast, the reaction proceeds to a higher degree so that the ultraviolet curable resin is hardened, thus tolerating a greater distortion. As shown in FIG. 3, the magnitude of distortion is related to $d/(R+d)$ wherein the thickness of the optical fiber ribbon 9 is 2d (mm) and the diameter of the guide roller 10 is 2R (mm). Here, FIG. 3 is a schematic view outlining the optical fiber ribbon 9 and the guide roller 10 without depicting the groove of the latter.

In view of the travelling period of time t (ms), the inventors have found that the optimal range concerning the parameter $d/[(R+d) \times t]$ where no distortion occurs has an upper limit of 0.2 and a lower limit of 0.00021. When such a condition is satisfied, the optical fiber ribbon 9 comes into contact with the guide roller 10 in a state where the curing reaction for the ultraviolet curable resin contained in the collective coating material 25 has sufficiently advanced. In this case, no damages are imparted to the surface of the optical fiber ribbon 9, and no micro-bendings occur in the coated optical fibers 1. Further, the transmission characteristic can be prevented from deteriorating, i.e., transmission loss can be prevented from increasing, without enlarging the equipment for making the optical fiber ribbon and without lowering the productivity.

Here, the thickness 2d (mm) of the optical fiber ribbon 9 refers to the thickness thereof after the ultraviolet curable resin contained in the collective coating material 25 is cured, and is determined by its cable configuration. The thickness 2d (mm) of the optical fiber ribbon 9 is preferably about 0.25 mm to about 0.5 mm and more preferably about 0.28 mm to about 0.45 mm.

On the other hand, the diameter 2R (mm) of the guide roller 10 is preferably 30 mm to 600 mm and more preferably 50 mm to 200 mm. When the diameter 2R of the guide roller 10 is less than 30 mm, even when compared at the same drawing speed in manufacture, its number of revolution becomes greater, whereby its bearing parts itself tend to be damaged sooner. When the diameter 2R of the guide roller 10 exceeds 600 mm, on the other hand, workability is likely to deteriorate, and the equipment tends to enlarge.

The reaching period of time t (ms) is preferably within the range of 10 ms to 2,000 ms and more preferably within the range of 10 ms to 1,000 ms. Here, t is determined by the position of the roller 10 (i.e., distance a (m) from the outlet 8a of the ultraviolet irradiation apparatus 8 to the position where the optical fiber ribbon 9 comes into contact with the roller 10) and the drawing speed v (m/s) of the optical fiber ribbon 9. Preferably, the distance a is 0.3 m to 2.0 m, whereas the drawing speed v is greater than 1 m/s. The workability tends to deteriorate when the distance a is less than 0.3 m, whereas the equipment tends to enlarge when the distance a exceeds 2.0 m.

EXAMPLES

In the following, the method of making the optical fiber ribbon in accordance with the present invention will be explained in further detail with reference to Examples 1 to 5, Comparative Examples 1 and 2, and Reference Examples 1 and 2.

Examples 1 to 4

A single-mode bare optical fiber glass having an outside diameter of 125 μm was coated with two layers respectively composed of two different kinds of urethane acrylate type ultraviolet curable resins. Further, a color layer made of an ultraviolet curable resin was coated thereon so as to make a coated optical fiber 1 having an outside diameter of 250 μm. First, from the supply 3 for delivery in which four rolls of the coated optical fibers 1 were disposed, these coated optical fibers 1 were delivered. Then, thus delivered coated optical fibers 1 were collectively coated with a collective coating material 25 in the coating apparatus 6. The collective coating material 25 was cured as being irradiated with an ultraviolet ray in the ultraviolet irradiation apparatus 8 so that the four coated optical fibers 1 were bundled together, thus yielding a 4-fiber ribbon 9. Here, the winding tension was set to 150 g.

In these Examples, urethane acrylate type ultraviolet curable resin A were used as the collective coating material 25 for bundling the four coated optical fibers 1 together, whereas 3 parts by weight of 2,4,6-trimethylbenzoyldiphenylphosphine oxide were added as a polymerization initiator to 100 parts by weight of A. Here, the urethane acrylate type ultraviolet curable resins A and B to D, which will be mentioned later, were resins different from each other having distinctive compositions. The contents of oligomers and multifunctional monomers in these resins were changed so as to set their glass transition temperatures different from each other. In order to measure the glass transition temperature of the collective coating material 25, the collective coating material 25 was chipped off from the manufactured optical fiber ribbon 9 with a razor, and thus obtained sample was measured by a viscoelasticity measuring apparatus (RHEO-VIVRON manufactured by Orientec Co., Ltd.). This measurement was performed under a condition where frequency was 11 Hz and heating rate was 3° C./minute, and the temperature yielding the maximum level of tan δ was determined as glass transition temperature.

Also, while the optical fiber ribbon 9 was being made, the distance between the outlet 8a of the ultraviolet irradiation apparatus 8 and the guide roller 10 and the drawing speed in manufacture were changed so as to adjust the period of time till the optical fiber ribbon 9 came into contact with the guide roller 10 after leaving the ultraviolet irradiation apparatus 8, i.e., the travelling period of time t. Also, by regulating the ribbon thickness (2d) and the diameter (2R) of the guide roller 10, the value of d/[(R+d)×t] was set smaller than 0.2.

As a characteristic test for thus manufactured optical fiber ribbon 9, transmission loss levels of the four coated optical fibers 1 immediately after their manufacture were measured. This measurement was conducted by use of an optical time domain reflectometer (OTDR) (AQ-7110C, manufactured by Ando Electric Co., Ltd.) which determined the amount of optical loss according to the intensity of scattered light. Their mean value is indicated as "mean loss" in Table 1. As for the lateral pressure test, immediately after 1 km of each of the four coated optical fibers 1 was wound with a tension of 600 g around a reel having a barrel diameter of 280 mm, transmission loss at a wavelength of 1.55 μm was measured by the OTDR, and then the mean value of the four coated optical fibers 1 was determined. Table 1 shows these results. Also, in Table 1, the thickness of the optical fiber ribbon 9 and the diameter of the guide roller 10 are respectively listed as "Ribbon thickness 2d" and "Roller diameter 2R." As shown in Table 1, Examples 1 to 4 yielded favorable characteristics in terms of both mean loss and lateral pressure test.

transmission loss (mean loss) after its manufacture, 0.202 dB/km, was favorable, and the lateral pressure test yielded a favorable level of transmission loss, 0.223 dB/km.

Comparative Example 1

An optical fiber ribbon 9 was manufactured in the same manner as Example 1 except that a guide roller 10 having a diameter of 60 mm was used. For thus obtained optical fiber ribbon 9, transmission loss was measured, and the lateral pressure test was performed. The results are shown in Table 1. As shown in Table 1, the level of transmission loss immediately after the manufacture increased to 0.254 dB/km. Also, the loss in the lateral pressure test was 0.284 dB/km, thus proving deterioration in the transmission characteristic.

Comparative Example 2

An optical fiber ribbon 9 was manufactured in the same manner as Example 3 except that a guide roller 10 having a diameter of 150 mm was used, and that the period of time till the optical fiber ribbon 9 came into contact with the guide roller 10 after leaving the ultraviolet irradiation apparatus 8 was set to 10 ms. For thus obtained optical fiber ribbon 9, transmission loss was measured, and the lateral pressure test was performed. The results are shown in Table 1. As shown in Table 1, the level of transmission loss immediately after the manufacture increased to 0.268 dB/km. Also, the loss in the lateral pressure test was 0.305 dB/km, thus proving deterioration in the transmission characteristic.

Reference Example 1

An optical fiber ribbon 9 was manufactured in the same manner as Example 2 except that urethane acrylate type

TABLE 1

| | Collective coating | Reaching time t (ms) | Ribbon thickness 2d (mm) | Roller diameter 2R (mm) | D/(R + d) | d/((R + d) × t) | Glass transition temp (° C.) | Mean loss (dB/km) | Lateral pressure test (dB/km) |
|---|---|---|---|---|---|---|---|---|---|
| Example 1 | A | 24 | 0.380 | 150 | 0.0025 | 0.1053 | 135 | 0.201 | 0.210 |
| Example 2 | A | 24 | 0.380 | 90 | 0.0042 | 0.1752 | 135 | 0.209 | 0.211 |
| Example 3 | A | 18 | 0.310 | 90 | 0.0034 | 0.1907 | 135 | 0.205 | 0.217 |
| Example 4 | A | 36 | 0.310 | 60 | 0.0051 | 0.1428 | 135 | 0.212 | 0.220 |
| Example 5 | B | 24 | 0.310 | 90 | 0.0034 | 0.1430 | 85 | 0.202 | 0.223 |
| Comparative Example 1 | A | 24 | 0.380 | 60 | 0.0063 | 0.2622 | 135 | 0.254 | 0.284 |
| Comparative Example 2 | A | 10 | 0.310 | 150 | 0.0021 | 0.2062 | 135 | 0.268 | 0.305 |
| Reference Example 1 | C | 24 | 0.380 | 90 | 0.0042 | 0.1752 | 65 | 0.196 | 0.261 |
| Reference Example 2 | D | 24 | 0.380 | 90 | 0.0042 | 0.1752 | 160 | 0.255 | 0.268 |

Example 5

An optical fiber ribbon 9 was manufactured in the same manner as Example 2 except that urethane acrylate type ultraviolet curable resin B were used as the collective coating material 25 for bundling the four coated optical fibers 1 together, 1.5 parts by weight of bis(2,6-dimethoxybenzoyl)-2,4,4-trimethylpentylphosphine oxide were added as a polymerization initiator to 100 parts by weight of B, and the ribbon thickness 2d was set to 0.310 mm. The glass transition temperature of resin B was 85° C. For thus obtained optical fiber ribbon 9, transmission loss was measured, and the lateral pressure test was performed. The results are shown in Table 1. As shown in Table 1, the ultraviolet curable resin C were used as the collective coating material 25 for bundling the four coated optical fibers 1 together, and that 3 parts by weight of 2,4,6-trimethylbenzoyldiphenylphosphine oxide were added as a polymerization initiator to 100 parts by weight of C. The glass transition temperature of this coating material 25 was 65° C. For thus obtained optical fiber ribbon 9, transmission loss was measured, and the lateral pressure test was performed. The results are shown in Table 1. As shown in Table 1, while the transmission loss immediately after its manufacture, 0.196 dB/km, was favorable, the loss in the lateral pressure test was 0.261 dB/km, thus proving deterioration in the transmission characteristic.

Reference Example 2

An optical fiber ribbon 9 was manufactured in the same manner as Example 2 except that urethane acrylate type ultraviolet curable resin D were used as the collective coating material 25 for bundling the four coated optical fibers 1 together, and that 1.5 parts by weight of bis(2,6-dimethoxybenzoyl)-2,4,4-trimethylpentylphosphine oxide were added as a polymerization initiator to 100 parts by weight of D. The glass transition temperature of this collective coating material 25 was 160° C. For thus obtained optical fiber ribbon 9, transmission loss was measured, and the lateral pressure test was performed. The results are shown in Table 1. As shown in Table 1, the transmission loss immediately after its manufacture was 0.255 dB/km, and that in the lateral pressure test was 0.268 dB/km, thus proving deterioration in the transmission characteristic.

As explained in the foregoing, in accordance with the present invention, since the relationship between the period of time till the optical fiber ribbon comes into contact with the guide roller after passing through the ultraviolet irradiation apparatus and its distortion is quantitatively determined, and its upper limit is defined, the optical fiber ribbon would come into contact with the guide roller in a state where the curing reaction for the collective coating material has sufficiently advanced, whereby no micro-bendings occur in the coated optical fibers, and no damages are imparted to the optical fiber ribbon surface. It is also advantageous in that transmission loss in the coated optical fibers can be prevented from increasing.

Further, as the glass transition temperature of the ultraviolet curable resin is set within a predetermined range, stress relaxation is accelerated, whereby the stress occurring due to bendings imparted to the optical fiber ribbon can be relaxed in a short period of time. Accordingly, the transmission characteristic can be prevented from deteriorating, and an optical fiber ribbon having a sufficient lateral pressure characteristic for practical use can be manufactured.

Also, when a predetermined amount of acylphosphine oxide type polymerization initiator is used as a photopolymerization initiator for the collective coating material, the curing reaction can be terminated faster, thus advantageously improving productivity.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making an optical fiber ribbon, said method comprising:

a step of preparing an ultraviolet irradiation apparatus and a guide roller having a diameter of 2R (mm);

a step of arranging at least two coated optical fibers in parallel in a plane;

a step of collectively coating thus arranged coated optical fibers with a collective coating material containing an ultraviolet curable resin;

a step of irradiating said collective coating material with an ultraviolet ray in said ultraviolet irradiation apparatus so that said collective coating material cures to form said optical fiber ribbon having a thickness of 2d (mm); and a step of bringing into contact with said guide roller said optical fiber ribbon leaving said ultraviolet irradiation apparatus such that a period of time t (ms) till said optical fiber ribbon comes into contact with said guide roller after leaving said ultraviolet irradiation apparatus satisfies the following relational expression:

$$d/[(R+d) \times t] < 0.2.$$

2. The method according to claim 1, wherein said t, R, and d satisfy the following relational expression:

$$0.00021 < d/[(R+d) \times t].$$

3. The method according to claim 1, wherein said ultraviolet curable resin has a glass transition temperature within a range of at least 70° C. but not higher than 150° C.

4. The method according to claim 3, wherein said ultraviolet curable resin has a glass transition temperature within a range of at least 80° C. but not higher than 140° C.

5. The method according to claim 1, wherein an acylphosphine oxide type polymerization initiator is added by at least 1 part by weight but not more than 5 parts by weight to 100 parts by weight of said ultraviolet curable resin in said collective coating material.

* * * * *